Nov. 25, 1952

M. E. CHANDLER 2,618,927

FUEL AND TORQUE CONTROL APPARATUS FOR
INTERNAL-COMBUSTION ENGINES

Filed June 25, 1946

INVENTOR.
MILTON E. CHANDLER
BY Lester W Clark
AGENT

Nov. 25, 1952   M. E. CHANDLER   2,618,927
FUEL AND TORQUE CONTROL APPARATUS FOR
INTERNAL-COMBUSTION ENGINES
Filed June 25, 1946   3 Sheets-Sheet 3

INVENTOR.
MILTON E. CHANDLER
BY
Lester W Clark
AGENT

Patented Nov. 25, 1952

2,618,927

UNITED STATES PATENT OFFICE 2,618,927

FUEL AND TORQUE CONTROL APPARATUS FOR INTERNAL-COMBUSTION ENGINES

Milton E. Chandler, New Britain, Conn., assignor, by mesne assignments, to Niles-Bement-Pond Company, West Hartford, Conn., a corporation of New Jersey Application June 25, 1946, Serial No. 679,187

23 Claims. (Cl. 60—39.28)

The present invention applies to fuel and torque control apparatus for internal combustion engines, inclusive of gas turbine engines and combination gas-turbine-and-jet engines.

The particular embodiment of my invention, as described in the appended specification, is intended for control of fuel delivered to an internal combustion engine suitable for propeller-propulsion or combined propeller-and-jet propulsion of aircraft; and for control of the engine torque.

In general, it may be assumed that the propeller used with such an engine absorbs substantially the total brake-horsepower of the engine and that the ratio of propeller torque to engine torque is constant. This assumption applies to the particular embodiment of the invention herein described, but the invention is not so limited.

The engine referred to usually includes a compressor, one or more combustion chambers, a turbine, and a tail pipe, in the order named. Associated with the engine is a fuel pump for delivering fuel to the combustion chamber and, connected to the compressor shaft, there is a gear train driving a propeller shaft and a propeller, at a speed less than engine speed.

Owing to structural and metallurgical limitations of this type engine, it is necessary to provide means preventing speeds and temperatures in excess of limiting values thereof, regardless of other means used to regulate fuel flow and torque, and it is generally desirable to limit the fuel flow so that for steady-state operation the engine temperature will not exceed a value which is a predetermined amount less than the allowable maximum temperature.

Because a fixed-pitch propeller cannot perform equally well under all conditions of flight, it is customary to employ variable pitch propellers. It is then possible to obtain relatively high propeller efficiency with a low pitch setting under conditions of take-off and climb at relatively high engine speed and power; and to obtain correspondingly high efficiency with a higher pitch setting under normal conditions of cruising speed and power. Variable pitch propellers are used to obtain constant engine speed, when desired. For a given condition of engine speed and brake-horsepower, engine torque varies according to the relation:

$$T = \frac{kBHP}{RPM}$$

in which T, k, BHP and RPM are respectively the engine torque, a constant, the engine brake-horsepower, and the engine speed. Propeller efficiency is defined as the ratio of thrust horsepower to engine brake-horsepower, and is a function of pitch and propeller characteristics, whence variable pitch control affords means whereby the relationship of engine speed, brake-horsepower, and torque may be controlled in flight.

The present invention employs fuel control apparatus substantially the same as that shown and described in my co-pending application Serial No. 664,412, filed April 23, 1946.

It is an object of the present invention to provide improved control apparatus for regulating both the fuel flow and the torque of an internal combustion engine.

Another object is to provide, in apparatus of the type described, improved means for regulating both the fuel flow and the torque as functions of an air pressure in the engine which is a measure of the mass air flow therethru.

A further object is to provide, in such a pressure responsive fuel and torque control, means for limiting the pressure responsive regulating means so that predetermined speed and temperature limits may not be exceeded.

Another object of this invention is to provide in such apparatus improved means, including a single manually-operated lever, for controlling both fuel flow and torque to satisfy particular operational requirements of speed and torque.

A further object of my invention is to provide improved fuel and torque control apparatus of simple design whereby the engine may be operated at constant maximum speed and varying load.

Figure 1:
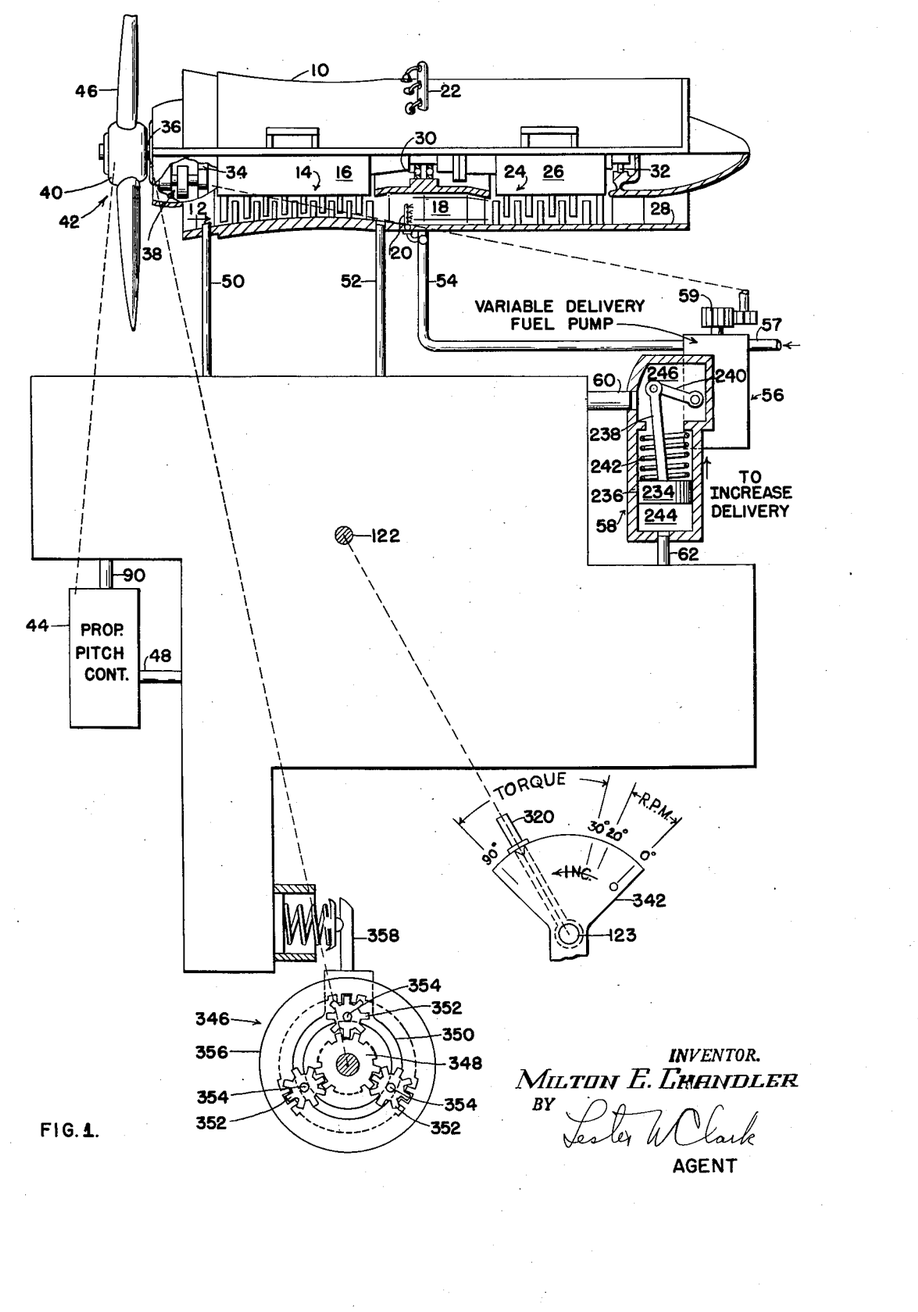
Figure 1 illustrates, somewhat diagrammatically, an internal combustion engine and associated means for propeller-and-jet propulsion of aircraft, and the principal connecting elements between the engine and the control apparatus of Figure 2, together with elements of a hydraulic motor diagrammatically shown in Figure 2.

Other objects and advantages of the present invention will become apparent from a consideration of the appended specification, claims, and drawing, in which:

FIGURE 1

Referring to the drawings, Figure 1, there are shown the principal elements of an internal combustion engine suitable for propeller-propulsion or propeller-and-jet propulsion of aircraft, as follows: a supporting casing 10, an air inlet 12, a multi-stage compressor indicated as 14, a compressor rotor shaft 16, a combustion chamber 18, a number of fuel discharge nozzles, one of which is designated 20, a generally circular fuel manifold 22, a multi-stage gas turbine indicated as 24, a turbine rotor shaft 26 connected to the compressor rotor shaft 16, a tail pipe 28 for discharge of combustion gases from turbine 24, a center bearing 30 and end bearings 32 and 34 supported by casing 10, a propeller shaft 36, and a gear train 38 connecting shaft 36 to shaft 16.

In the hub 40 of the propeller generally shown as 42, there is an hydraulically-operated pitch-control diagrammatically shown as 44 for varying the pitch of the propeller blades 46. Pitch-control 44 is connected by conduits 48 and 90 to the control apparatus of Figure 2, shown diagrammatically in Figure 1.

Figure 2:
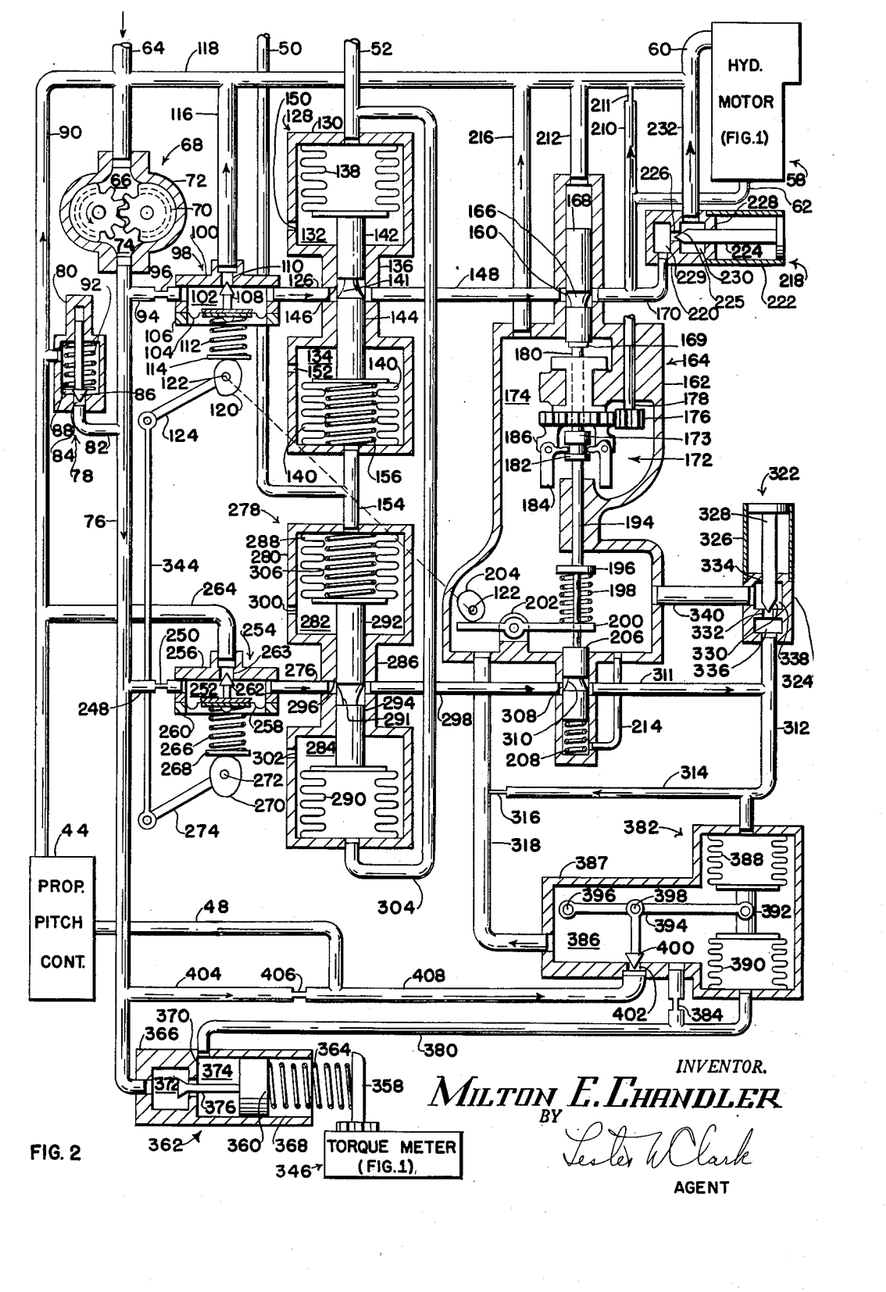
Figure 2 shows, somewhat diagrammatically, fuel and torque control apparatus embodying the principles of my invention.

A tube 50 connects the control apparatus of Figure 2 to the air entrance 12 in the engine and supplies air to the control apparatus at the static pressure in entrance 12. Similarly, a tube 52 connects the control apparatus to the engine and supplies air to the control apparatus at the static pressure on the discharge side of compressor 14. A compressor pressure differential is thus obtained which is a function of the compressor characteristics, the engine speed, air entrance pressure and temperature, and variable conditions downstream from the compressor, including variations in combustion temperature, in the fuel flow to the engine, and in the engine brake-horsepower. The differential is an indication of mass airflow thru the engine. Assuming constant engine speed, it decreases as altitude increases, or as entering air density decreases; and it also decreases as the combustion temperature increases.

The fuel manifold 22 in the engine is connected to a variable delivery fuel pump 56 by a conduit 54, and pump 56 is connected to a source of fuel by conduit 57. The delivery of pump 56 is varied by an hydraulic motor 58 connected to the control apparatus by conduits 60 and 62. Pump 56 is driven by the engine thru gearing 59.

Motor 58 comprises a piston 234 operating in a cylinder 236 and being connected by a rod 238 and a lever 240 to the delivery varying means of fuel pump 56. A spring 242 tends to move the piston toward a position for minimum delivery. An opposing force acting on piston 234 and produced by the differential between the respective pressures in chambers 244 and 246 tends to increase delivery. It is permissible to assume the pressure in chamber 246 and conduit 60 substantially constant, whence it is apparent that for each value of the pressure in chamber 244 and conduit 62 there is a corresponding value of fuel flow.

FIGURE 2

Referring to the drawing, Figure 2, there is shown an inlet conduit 64 for the flow of engine lubricating oil to an inlet chamber 66 in a pump 68, which includes a housing 72, a pair of gears 70, and an outlet chamber 74 from which oil flows into a main conduit 76 at a superatmospheric pressure greater than the pressure in conduit 64. An independent source of hydraulic fluid other than engine oil may be employed if desired.

The value of superatmospheric pressure in conduit 76 is controlled by a relief mechanism 78 which includes a body 80 having a connection 82 with main conduit 76 for the flow of oil thru a passage 84, past a valve 86, into a chamber 88 connected to a conduit 90 which returns the oil to inlet conduit 64. A spring 92 imposes a substantially constant load on valve 86, in consequence of which the pressure in passage 84 and main conduit 76 is maintained substantially constant.

Oil flows from conduit 76 to a first outlet conduit 94 and thru a fixed restriction 96 to a chamber 102 in a pressure regulator 98. Regulator 98 includes a body 100 and a diaphragm assembly 104 which together form chamber 102, a diaphragm retainer 106, a valve 108 attached to diaphragm assembly 104 and operable in a seat 110 in body 100. Seat 110 is connected by drain conduits 116 and 118 to inlet conduit 64. A spring 112, in compression between diaphragm assembly 104 and a spring retainer 114, tends to move valve 108 toward seat 110, thereby decreasing flow from chamber 102 past valve 108, in opposition to a force proportional to the pressure differential across diaphragm assembly 104. While any other suitable pressure may be employed on the lower side of the diaphragm assembly 104, the pressure employed according to Figure 2 is atmospheric, whence the pressure in chamber 102 may be referred to as gage pressure. Valve 108 is maintained in equilibrium by the balance of forces due to the gage pressure in chamber 102 acting on one side of diaphragm assembly 104 and to spring 112 on the other. The spring force and hence the gage pressure in chamber 102 are substantially constant when retainer 114 is stationary.

The particular value of pressure in chamber 102 is determined by the position of retainer 114 which is controllable by means of a cam 120 mounted on a shaft 122 which is manually operable by an engine control lever 320, shown in Figure 1. The pressure in chamber 102 varies directly with the compression of spring 112, which in turn is responsive to changes in angular displacement of cam 120.

As shown, pump 68 may be driven by the engine and is of sufficient capacity to provide high pressure at low starting speeds. Both the volume and the pressure of oil flowing from the relief valve mechanism 78 are subject to wider variations than the corresponding volume and pressure of oil flowing from the pressure regulator 98. Regulator 98 is therefore of relatively smaller capacity and greater regulating accuracy than the mechanism 78.

The maximum pressure differential across restriction 96 is small enough to permit a satisfactorily large volume of flow therethru. The arrangement shown is well adapted to an installation in which the fluid pump 68 is remotely located in respect to the rest of the fuel and torque control, since valve mechanism 78 eliminates the effect on regulator 98 of line loss between pump 68 and other principal elements of the apparatus.

Pressure regulator 98 is connected by a conduit 126 to a control valve mechanism 128, comprising a housing 130 having chambers 132 and 134 in its opposite ends separated by a constriction 136 in housing 130. A pair of bellows, 138 and 140, respectively, are mounted in chambers 132 and 134, both being anchored at their outer ends to housing 130, and being connected to each other by a valve 142 which operates in a guide 144 centrally located in constriction 136. A path is provided for flowing oil from conduit 126 thru control mechanism 128, consisting of a port 146 in guide 144 past an undercut 141 in valve 142 and to a channel 148. The spaces outside bellows 138 and 140, in chambers 132 and 134, respectively, are vented at vents 150 and 152 to atmosphere; but, if desired, they may be vented to any suitable common source of low or high pressure.

The interior of bellows 138 is connected by conduit 52 to the compressor discharge pressure in the engine, Figure 1. The interior of bellows 140 is connected by a conduit 154 to conduit 50 and thereby to the pressure in entrance 12 of the engine, Figure 1. Valve 142 is therefore subjected to a force proportional to the differential between the compressor discharge and compressor inlet pressures which tends to move valve 142 downward. A spring 156 is employed in opposition to this compressor pressure differential to permit establishing the valve 142 in a definite positional relationship with port 146 for all values of the compressor pressure differential, the rate of spring 156 determining the rate of change of valve position in respect to compressor pressure differential change.

The undercut 141 in valve 142 varies the effective area of port 146, as desired, from a minimum value when the compressor pressure differential is minimum, to a maximum effective area when the differential is maximum. The contour is determined by engine requirements corresponding to various values of the differential, and valve 142 and port 146 are made co-functional to produce a desired rate of change in effective port area over the full range of compressor pressure differential, as is subsequently explained. From channel 148, oil flows thru a port 160 in a housing 162 of a governor mechanism 164, past an undercut 166 in a valve 168, thence out of housing 162 and into a conduit 170. The governor mechanism 164 includes a speed-responsive device 172, in a chamber 174, driven by a gear 176 mounted on a shaft 178 which is connected to the engine and driven at a speed proportional to engine speed. A spindle 180 is attached to valve 168 and has a grooved bearing 182 at an intermediate point between its upper and lower ends, and is operable by the device 172 to move upward and downward relative to housing 162 in response to movement of a pair of fly-weights 184 relative to their rotatable support 186.

Housing 162 provides a guide 194 for spindle 198, toward the lower end of which there is a flange 196 which is supported by a spring 198 held in compression by one end of a lever 200 having an intermediately disposed fulcrum 202. The left end of lever 200 is operable by a cam 204 mounted on shaft 122. The lower end of spindle 180 is connected to a valve 206 which is held against the spindle by a spring 208 in compression between housing 162 and valve 206. The force exerted by spring 208 is relatively small and may be sufficient only to cause valve 206 to follow movement of spindle 180.

Conduit 212 is used to subject the chamber adjacent the upper end of valve 168 to the pressure in conduit 118. Similarly, conduit 214 connects the chamber adjacent the lower end of valve 206 to chamber 174, thence to a conduit 216 which is also connected to conduit 118; whereby valves 168 and 206 are hydraulically balanced and subject only to forces due to the springs and to fly-weights 184.

Assuming the position of cam 204 to be fixed, it is apparent that as the speed increases, fly-weights 184 move spindle 180 downwardly; and, at a predetermined speed at which the downward force exerted by the fly-weights on bearing 182 exceeds the net upward force due to springs 198 and 208 acting on spindle 180, valve 168 is made to reduce the effective area of port 160. Stops 169 and 173, respectively, are provided on spindle 180 to prevent over-travel of valves 168 and 206 beyond extreme closed and wide-open positions.

Oil flows from conduit 170 thru a conduit 210 and a fixed restriction 211 to drain conduit 118. As the effective area of port 160 is reduced the flow of oil to conduit 170 is also reduced, and hence the pressure in conduits 170 and 210 is decreased.

The pressure in conduits 170 and 210 is subject to modification by a thermal control 218 comprising a body 220 having fixed thereto a relatively thin wall tube 222 having its end opposite body 220 closed for support of a rod 224. Tube 222 is subjected to the temperature of the tail pipe 28, Figure 1, or to any other desired engine temperature. A valve 225 affixed to the free end of rod 224 is operable in a seat 226 in body 220, there being a wall 228 in body 220 apertured for guiding rod 224. A pair of chambers 229 and 230, on the opposite sides of the seat 226, are respectively connected to conduit 170 and a drain conduit 232, which in turn is connected to drain conduit 118. Valve 225 is thereby effective to control the flow from conduit 170 to chamber 229 thru seat 226 and past the valve into chamber 230, thence to drain conduit 232. The rod 224 and tube 222 are made of materials having substantially different coefficients of thermal expansion, so that upon an increase in temperature of the tube 222 it expands faster than rod 224, thereby increasing the area of flow past valve 225 in seat 226. Thermal control 218 is generally made so that the valve remains closed at tail pipe temperatures below a predetermined limiting value, and the rate of opening is controlled by valve contour and the characteristics of rod 224 and tube 222. The rod-and-tube thermostat is shown only as an example of a suitable temperature responsive device for operating valve 225. It should be understood that other equivalent mechanisms may be used in its stead.

Conduit 210 is connected to the hydraulic motor 58 of Figure 1 by means of conduit 62 and the motor is connected to drain conduit 118 by conduit 60.

The pressure in conduit 62 is the same as that in conduits 210 and 170, and is the motor pressure the regulation of which has been previously explained and is now summarized. In chamber 102 of regulator 98, there is oil at a substantially constant superatmospheric pressure depending on the position of cam 120. Excepting that required to render the apparatus operable, the fluid flowing from chamber 102 thru conduit 126 ultimately enters a return conduit 118 connected to inlet conduit 64 in which the pressure has a substantially constant lower value. In the course of flow from chamber 102 to conduit 64 there is valve means for varying the motor pressure in conduit 170 and hence the fuel flow to the engine; namely, the control valve mechanism 128 which increases the flow from chamber 102 and hence increases the motor pressure as the compressor pressure differential increases. In addition to the pressure varying means there are means to over-ride the control valve mechanism; namely, the speed governor mechanism 164 which operates a valve 168 so that the flow from conduit 148 to conduit 170 is decreased, hence decreasing the motor pressure, as the engine speed exceeds a predetermined value; and thermal control 218 which decreases the pressure in conduit 170, and hence the motor pressure, when valve 225 opens or when the tail pipe temperature exceeds a predetermined value. As described above, the fuel flow varies directly with the motor pressure.

Parallel with the first outlet conduit 94 there is a second outlet 248 from main conduit 76. From outlet 248 oil flows thru a fixed restriction 250, which parallels restriction 96, and enters a chamber 252 in a pressure regulator 254 which parallels regulator 98 and serves a similar purpose in substantially the same manner. Regulator 254 includes a body 256 and a diaphragm assembly 258 which together form chamber 252, a diaphragm retainer 260, a valve 262 attached to diaphragm assembly 258 and operable in a seat 263 in body 256. Seat 263 is connected by a drain conduit 264 to conduits 90 and 64. A spring 266, in compression between diaphragm assembly 258 and a spring retainer 268, tends to move valve 262 toward seat 263, thereby decreasing flow from chamber 252 past valve 262, in opposition to a force proportional to the pressure differential across diaphragm assembly 258. While any other suitable pressure may be employed on the lower side of diaphragm assembly 258, use of atmospheric pressure is shown in Figure 2, whence the pressure in chamber 252 may be referred to as gage pressure. Valve 262 is maintained in equilibrium by the balance of forces due to the gage pressure in chamber 262 acting on one side of the diaphragm assembly 258 and to spring 266 on the other. The spring force and hence the gage pressure in chamber 262 are substantially constant when retainer 268 is stationary.

The particular value of pressure in chamber 252 is predetermined by the position of retainer 268 which is controllable by means of a cam 270 mounted rotatably on a bearing 272. The pressure in chamber 252 varies directly with the compression of spring 266, which in turn is responsive to changes in angular displacement of cam 270. While the relief valve mechanism 78 maintains substantially constant pressure on the upstream side of restriction 250, pressure regulator 254 maintains a substantially constant pressure downstream from restriction 250 within narrower limits, the capacity of valve 262 being relatively less than that of valve 86 owing to the smaller range of downstream pressure variations and because the flow thru regulator 254 is only a part of the total flow in main conduit 76.

Pressure regulator 254 is connected by a conduit 276 to a control valve mechanism 278, comprising a housing 280 having chambers 282 and 284 in its opposite ends separated by a constriction 286 in housing 280. A pair of bellows, 288 and 290, respectively, are mounted in chambers 282 and 284, both being anchored at their outer ends to housing 280, and being connected to each other by a valve 292 which operates in a guide 294 centrally located in constriction 286. A path is provided for flowing oil from conduit 276 thru control mechanism 278, consisting of a port 296 in guide 294 past an undercut 291 in valve 292 to a channel 298. The spaces outside bellows 288 and 290, in chambers 282 and 284 respectively, are vented at vents 300 and 302 to atmosphere; but, if desired, they may be vented to any suitable common source of low or high pressure.

The interior of bellows 290 is connected by a conduit 304 to conduit 52, thence to the compressor discharge pressure in the engine, Figure 1. Bellows 290 and 238 are thus subject to the same internal pressure. The interior of bellows 288 is connected to the interior of bellows 140 by conduit 154, which is connected to conduit 50 and thereby to the pressure in entrance 12 of the engine, Figure 1. Valve 292 is therefore subjected to a net force proportional to the differential between the compressor discharge and compressor inlet pressure which tends to move valve 292 upward.

While the use of two bellows responsive to the differential between static compressor discharge pressure and static compressor inlet pressure is specified for both control mechanisms 128 and 278 in the embodiment of my invention shown and described herein, alternate arrangements for either control mechanism include use of either a single bellows or a pair of bellows responsive to the compressor rise, the absolute compressor discharge pressure, the compressor discharge gage pressure, the absolute inlet impact pressure, the differential between compressor discharge pressure and compressor inlet impact pressure, or to the differential between static and impact pressures in the course of air flow.

A spring 306 is employed in opposition to the compressor pressure differential to permit establishing the valve 292 in a definite positional relationship with port 296 for all values of the compressor pressure differential, the rate of spring 306 determining the rate of change of valve position in respect to compressor pressure differential change.

The undercut 291 in valve 292 varies the effective area of port 296, as desired, from a minimum value when the compressor pressure differential is minimum, to a maximum effective area when the differential is maximum. The contour is determined by engine requirements corresponding to various values of the differential, and valve 292 and port 296 are made co-functional to produce a desired rate of change in effective port area over the full range of compressor pressure differential.

From channel 298, oil flows thru a port 308 in housing 162 of governor mechanism 164, past an undercut 310 in valve 206, thence out of housing 162 and thru conduits 311, 312, and 314, into a restriction 316 from which it enters a drain conduit 318, and thence flows to chamber 174 in governor mechanism 164 to conduits 216 and 118 which return the oil to inlet conduit 64.

The pressure in conduits 311, 312, and 314 is subject to modification by a thermal control 322, similar to thermal control 218 previously described, comprising a body 324 having fixed thereto a relatively thin wall tube 326 having its end opposite body 324 closed for support of a rod 328 and subjected to the temperature of the tail pipe 28, Figure 2. A valve 330 affixed to the free end of rod 328 is operable in a seat 332 in body 324, there being a wall 334 in body 324 apertured for guiding rod 328. A pair of chambers 336 and 338, on opposite sides of the seat 332, are respectively connected to conduit 312 and a drain conduit 340 which in turn is connected to the drain pressure in chamber 174 in governor mechanism 164. Valve 330 is thereby effective to control the flow from conduit 312, to chamber 336, thru seat 332, and past the valve into chamber 338, thence to drain conduit 340. The rod 328 and tube 326 are made of materials having substantially different coefficients of thermal expansion, so that upon an increase in temperature of the tube 326 it expands faster than the rod 328, thereby increasing the area of flow past valve 330 in seat 332. Thermal control 322 is generally made so that the valve remains closed at tail pipe temperatures below a predetermined limiting value, and the rate of opening is controlled by the contour of valve 332 and the characteristics of rod 328 and tube 326.

As speed decreases below the predetermined value for which governor mechanism 162 is set, spindle 180 and valve 206 move upward and the effective area of port 308 is decreased, thereby reducing the flow of oil to conduit 312 and hence reducing the pressure therein. The contour of undercut 310 on valve 206 determines the rate of change of effective area of port 308 as speed decreases below the governor setting value.

The pressure of oil in conduit 312 is hereinafter referred to as the torque regulating pressure and is a measure of desired torque. Control of the torque regulating pressure in conduit 312 is summarized as follows. In chamber 252 of regulator 254 there is oil at a substantially constant superatmospheric pressure depending upon the position of cam 270. Oil flowing from chamber 252 thru conduit 276 ultimately enters return conduits 318, 216, and 118 which is connected to inlet conduit 64. In this course of flow from chamber 252 to inlet conduit 64 there is a main valve means for varying the pressure in conduit 312; namely, the control valve mechanism 278 which increases the flow from chamber 252 and hence increases the pressure in conduit 312 as the compressor pressure differential increases. In addition, there are other valve means for over-riding the main control valve means for varying the flow; namely, the governor valve mechanism 164 operating valve 206 so that the flow (and hence the pressure in conduit 312) decreases as the engine speed decreases below a predetermined setting value; and thermal control 322 which decreases the pressure in conduit 312 when valve 330 opens or when the tail pipe temperature exceeds a predetermined value.

Again referring to the drawings, Figures 1 and 2, it will be shown in what manner the torque regulating pressure in conduit 312 is applied to obtain the engine torque desired. In Figure 1, there is shown a torque meter 346 connected to a forward section of propeller shaft 36 and including: a sun gear 348 fixed to the forward section of shaft 36, a torque ring 350 concentric with gear 348 and connected thereto by three symmetrically disposed planet gears 352 rotatable on bearings 354 fixed to torque ring 350. An outer ring gear 356 engages the planet gears 352 and is fixed to a rearward section of shaft 36, the forward and rearward sections of shaft 36 being substantially the equivalent obtained by cutting thru a single shaft at right angles to the shaft center-line. In operation, when the torque ring 350 is held stationary, the motion of the rearward section of shaft 36 is transmitted to the forward section of shaft 36 thru gears 352. The force required to hold the torque ring 350 stationary is a measure of shaft torque and is transmitted thru a lever 358 attached to torque ring 350 to a piston 360 (Figure 2) in a pressure control mechanism 362 thru a spring 364.

Pressure control mechanism 362 comprises a body 366 having a cylindrical bore 368 opening at one end of body 366 for admission of piston 360 which is slidable in bore 368. The other end of body 366 is closed and between the closed end and piston 360 there is a wall 370 which forms chambers 372 and 374 respectively on the upstream and downstream sides of a valve 376 which is attached to piston 360. Chamber 372 is connected to main oil supply conduit 76. Chamber 374 is connected to a conduit 380. In operation, the piston 360 is subject to the force of spring 364 and the opposite force of the pressure in chamber 374 acting on piston 360. When the spring force exceeds the force due to pressure in chamber 374 the piston 360 moves leftward to increase oil flow from chamber 372 to chamber 374 until the forces are balanced.

The position of piston 360 for a condition of equilibrium varies slightly with the pressure in chamber 374, depending upon the design of valve 376, the pressure in chamber 372 being substantially constant. The position of lever 358 depends upon the position of piston 360 and the compressed length of spring 364 which is a function of the fixed quantities, free length and rate of spring 364, and of the variable spring load or torque-measuring force required to retain torque ring 350, Figure 1, in a given position. The load on spring 364 is not materially affected by the positions of either piston 360 or lever 358 within their respective ranges of travel, so that the pressure in chamber 374 and conduit 380 is proportional to torque according to a substantially constant ratio of pressure to torque. A suitably hinged incompressible link may be employed between piston 360 and lever 358 in lieu of spring 364, if desired.

Conduit 380 is connected to a torque control mechanism 382 thru a restriction 384 from which oil flows into a chamber 386 in a body 387 of torque control mechanism 382 to conduit 318, thence thru chamber 174 and conduit 216 to drain conduit 118 connected to inlet conduit 64. Restriction 384 provides continuous flow past valve 376 in pressure control mechanism 362, thereby rendering it possible for the pressure in chamber 374 to decrease when the torque, and hence the force of spring 364, decreases and piston 360 moves to the right to close valve 376.

Torque control mechanism 382 has a pair of bellows 388 and 390 in chamber 386. One end of bellows 388 is fixed to body 387 and has its interior connected to conduit 312. One end of bellows 390 is connected to body 387, is symmetrically disposed opposite bellows 388, and has its interior connected to conduit 380. There is a rigid connection 392 between the free ends of bellows 388 and 390. A lever 394 has one end pivoted at approximately the center of connection 392 and has its other end connected to a pivot 396 fixed to body 387 in chamber 386. Between the ends of lever 394 there is a hinged connection 398 between lever 394 and a valve 400 which operates in a seat 402 in body 387. The bellows 388 and 390 are respectively responsive to the torque regulating pressure in conduit 312, which is a measure of desired torque, and the pressure in conduit 380, which is a corresponding measure of actual torque.

In Figure 1, there is shown diagrammatically a propeller pitch control responsive to a fluid pressure differential between the pressure in a conduit 48 and the relatively lower pressure in conduit 90 which is connected to the engine oil pressure in inlet conduit 64. Increase of the pressure differential increases the propeller pitch and hence the propeller and engine torque. It is the function of torque control mechanism 382, Figure 2, to regulate the pressure in conduit 48 so that the propeller pitch produces a value of torque such that permits mechanism 382 to be in substantially constant equilibrium. To accomplish this there is a conduit 404 for the flow of fluid from main conduit 76 thru a restriction 406 into a conduit 408 which is connected to conduit 48 and to seat 402 in torque control mechanism 382. Thus, when the pressure in bellows 388 equals the pressure in bellows 390, actual torque equals desired torque and the torque control mechanism 382 is in equilibrium and valve 400 is in a neutral position with respect to seat 402. This neutral position is one in which the flow thru valve 400 is substantially the same as the flow thru restriction 406, so that there is no change in pressure in conduits 408 and 48.

By this arrangement, when actual torque is less than desired torque and in consequence torque control mechanism 382 is unbalanced, bellows 388 forces connection 392 downward in opposition to bellows 390 and lever 394 lowers valve 400 toward seat 402, whereby the pressure in conduits 408 and 48 increases and the propeller pitch increases, until the value of torque increases so that the torque control mechanism 382 is again in equilibrium. A similar process applies when actual torque is greater than desired torque; in this case bellows 390 moves connection 392 upward in opposition to bellows 388 and the torque regulating pressure in conduit 312, raising valve 400 and allowing the pressure in conduits 408 and 48 to decrease, thereby decreasing the propeller pitch, and thus decreasing the torque until equilibrium of torque control mechanism 382 is again restored and the actual torque equals the desired torque as indicated by the calibrated quadrant 342, Figure 1.

The various manually-operated elements of the apparatus of Figure 2 are mechanically coordinated by means of: the manually-operated lever 320, Figure 1, fixed to a shaft 123 which is connected to shaft 122, Figure 2; and a link 344 connecting a pair of levers 124 and 274, respectively, attached to shafts 122 and 272. Lever 320 is operable thru an approximately ninety degree arc indicated by a calibrated fixed quadrant 342, Figure 1. Lever 320 and quadrant 342 may be located remote from shaft 122 and connected thereto by suitable linkage.

Figure 3:
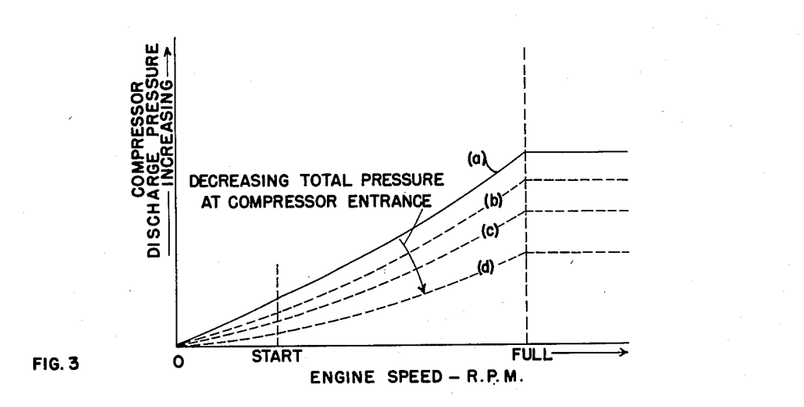
Figures 3 and 4 graphically indicate the respective relationships between principal variables affecting performance of the improved control herein specified.

FIGURE 3

Referring to Figure 3, there is shown a family of curves which indicate the relationship between the compressor discharge pressure and the engine speed, for a range of values of total air pressure at air entrance 12 in the engine. Both control valve mechanisms 128 and 278, Figure 2, are responsive to an air pressure differential, the characteristics of which are largely determined by and are very similar to those of the compressor discharge pressure.

As previously explained, the compressor discharge pressure is a function of factors including the engine speed, the compressor characteristics, and the pressure and density of entering air, as well as corresponding density and pressure of the air downstream from the compressor which vary with the rate of temperature of combustion, and other factors.

Principal causes of variation in the compressor discharge pressure in an engine used in flight are: the engine speed; the altitude density as measured by the pressure and temperature of the atmosphere in which flight occurs; and the speed of flight which determines the ramming effect on air entering the engine.

The curve (a) in Figure 3 applies to a condition in which the total pressure at the compressor entrance is maximum, such as occurs when the altitude density is maximum, as for low temperature sea-level operation; and in which the speed of flight is the maximum obtainable at the particular engine speed indicated.

As the total pressure at the compressor entrance decreases; or, as the speed of flight decreases and/or the altitude density decreases as a result of altitude pressure or temperature changes; the compressor discharge pressure decreases as indicated by curves (b), (c) and (d), depending on the extent to which the total entrance air pressure is reduced.

Each curve is characterized by an increase of compressor discharge pressure, as the engine speed increases from zero to maximum value. The horizontal portions of curves (a)–(d) apply to constant full-speed engine operation, during which, as subsequently shown, the engine torque is variable while the speed and the compressor discharge pressure remain constant, assuming constant total pressure of entering air.

In accelerating the engine at constant conditions of flight, the value of the compressor discharge pressure increases from zero to a value corresponding to the speed of the engine at which such acceleration ceases and steady-state operation begins. The time required for increasing the engine speed between any two values of speed directly affects the response of control mechanisms 128 and 278, Figure 2, which cannot be at a faster rate than the change in engine speed permits. The effect of control mechanisms 128 and 278, however, is rendered subject to additional timing control principally by provision of the respective contours of undercuts 141 and 291 in valves 142 and 292.

Normally, in flight, as the engine speed increases there are corresponding changes in both the speed of flight and the altitude density, and the compressor discharge pressure characteristics are correspondingly altered from those indicated by the curves of Figure 3. It is beyond the scope of any simplified illustration such as that afforded by Figure 3 to graphically indicate the relationship of the compressor pressure differential to engine speed under all conditions of engine operation.

Figure 4:
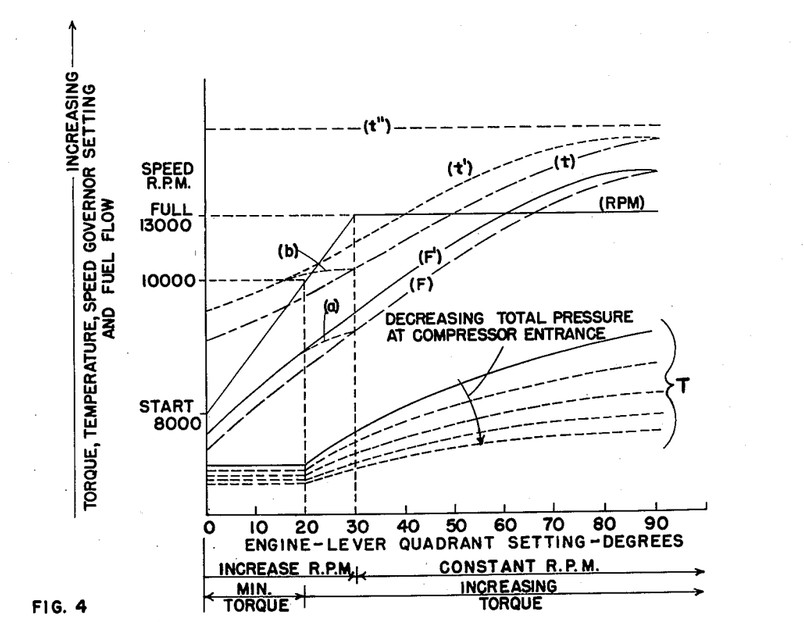

FIGURE 4

An explanation of the coordinated functions of the control apparatus of Figure 2 is facilitated by reference to the performance curves indicated in Figure 4, in addition to Figures 1 and 2.

Considering only the governor mechanism 164, Figure 2, cam 204 is generated so that as lever 320 and shaft 123 of Figure 1 are moved approximately twenty degrees in a counter-clockwise direction from their zero positions, the predetermined speed at which valve 168 becomes effective to over-ride control valve mechanism 128 increases from minimum value to a preselected value hereinafter designated "minimum cruising engine speed." In one embodiment of my invention the minimum cruising engine speed approximates 10,000 revolutions per minute. During the next ten degrees the value of speed at which valve 168 becomes effective to over-ride control mechanism 128 is further increased to maximum allowable revolutions per minute, or to full speed. In the said embodiment, the full speed approximates 13,000 R. P. M. Further movement of the lever, approximately from a thirty degree position to the maximum, or ninety degree position, does not change the governor mechanism setting. Cam 204 therefore is generated to provide increasing lift for the first thirty degrees rotation from zero position, and constant lift from approximately thirty to ninety degree positions.

Curve (RPM), Figure 4, shows the relationship between the engine speed governor setting and the engine lever quadrant setting. In the embodiment herein described, the quadrant 342, Figure 1, is provided with a graduated scale on which governor setting speeds are marked to correspond with the first thirty degrees counterclockwise movement of lever 320. The engine is accelerated by external means to a starting speed approximately 8,000 R. P. M. at which self-operation occurs. As shown by the curve (RPM), the scale may be marked "Start" or "8,000 RPM," at zero degrees quadrant setting; "Minimum Cruising Speed" or "10,000 RPM," at 20° quadrant setting; and "Full Speed," or "13,000 RPM," from 30° to 90° quadrant settings, inclusive. Beyond the thirty degree quadrant position, movement of lever 320 has no effect on the engine speed governor setting, which remains constant as indicated by the horizontal portion of curve (RPM).

The curve (RPM) also indicates the engine speed for any position of control lever 320, under conditions of steady state operation; i. e., without acceleration. When engine speed acceleration occurs, as a result of rapid movement of control lever 320, the engine speed lags behind the quadrant setting speed at all lever positions except the final position, at which movement of the lever is stopped. At this point, the engine speed approaches the setting speed within an interval of time determined by the engine and the control apparatus, and steady state operation ensues.

The relatively short time required for response of the governor mechanism and the apparatus to speed changes normally cause the portion of the (RPM) curve shown as a horizontal line to droop slightly downward from the 30° quadrant position, owing to increasing extent of activity of the governor valve 168 as the engine brake-horsepower increases corresponding to movement of the lever from 30° to 90° quadrant positions as subsequently explained.

The horizontal portions of the family of curves shown in Figure 3 correspond to the horizontal portion of curve (RPM) of Figure 4. Similarly, the rising portion of curve (RPM) of Figure 4 corresponds to the rising portions of curves (a)-(d), Figure 3, between "Start" and "Full" positions indicated on the engine speed scale.

Without provision of means to relieve the governor mechanism from substantially full control of fuel flow to the engine by operation of valve 168 in Figure 2, the mechanism would be required to greatly reduce the fuel flow at low quadrant settings. The required fuel flow reduction and hence the extent of activity of the governor mechanism would decrease as the engine speed approached the maximum value at 30° quadrant setting. Performance of both the apparatus and the engine, in the embodiment herein described, is improved by requiring the governor mechanism to do as little as possible and necessary at any time, during the first 30° of movement of lever 320. It is therefore desirable to maintain a condition in which there is a substantially constant relationship between the fuel flow deliverable to the engine without governor cut-in and the fuel flow required by the engine at any speed and torque corresponding to the first 30° of lever movement. The pressure regulator 98 serves this purpose by controlling the maximum motor pressure available before cut-in of the governor mechanism, at any given value of the compressor pressure differential.

As the control lever 320 is moved from zero position to 30° quadrant setting, corresponding to a speed increase to maximum speed, the lift of cam 120 in pressure regulator 98 increases. For steady state operation at a given engine speed and compressor entrance pressure, there is a corresponding value of compressor discharge pressure, as indicated by Figure 3, and hence a corresponding position of the valve 142 in control valve mechanism 128. Thus, for steady state operation at a given engine speed and constant flight conditions, the position of valve 142 is fixed and hence the fuel flow to the engine is controlled solely by the governor mechanism and the pressure regulator 98. Regulator 98 responds to movement of cam 120 so that the pressure upstream from valve 168, at a given quadrant position, is only slightly greater than the motor pressure downstream from valve 168 required to set the fuel flow to maintain the speed corresponding to that quadrant position. The governor mechanism is thus not over-taxed in its speed-limiting function.

Movement of the control lever 320 betwen its zero and twenty degree positions does not change the predetermined value of desired torque, which remains a minimum. As the lever is advanced from 20° to 30° positions, the desired value of torque increases slightly, and as the lever is further advanced from 30° to 90° positions the predetermined value of desired torque increases to a maximum value, as shown by the family of curves (T), Figure 4. The engine torque is a function of the compressor pressure differential acting in control valve mechanism 278, as previously explained, and since the differential varies as explained in connection with Figure 3, it follows that the predetermined value of desired torque corresponding to any position of the control lever 320 decreases as the total pressure at the compressor entrance decreases, or as the speed of flight decreases and approximately as the altitude of flight increases.

In response to movement of the control lever 320, shaft 272 and cam 270 in the pressure regulator 254, Figure 2, are moved to vary the torque regulating pressure in conduit 312. Cam 270 is generated so that, during the first 20° counterclockwise movement of lever 320 from zero position, the cam lift and hence the pressure in chamber 252 have minimum values, whereby for a given steady state condition of flight, the torque regulating pressure is minimum. Upon 10° additional movement of lever 320, the lift of cam 270 increases slightly and there is a corresponding increase in the value of the torque regulating pressure in conduit 312. During the final 60° movement of the control lever, between 30° and 90° positions, the lift of cam 270 further increases to a maximum value. At the 90° position, both the engine speed setting as determined by the lift of cam 204 and the torque regulating pressure determined by the lift of cam 270 are maximum. Simultaneously, during the last 60° of movement of lever 320, from 30° to 90° quadrant positions, the lift of cam 120 increases slightly so that, in order to maintain the constant maximum speed predetermined by the governor mechanism, the fuel flow is increased to compensate for the torque increase which would otherwise decelerate the engine. Thus, at the full-throttle position of lever 320, both the desired speed and torque are maximum, whereby, in steady state operation, the engine brake-horsepower is maximum and the fuel flow to the engine is maximum.

Referring to curve (F), Figure 4, there is shown the relationship between fuel flow to the engine and the angular quadrant setting, for steady-state operation under conditions corresponding to curve (a), Figure 3, in which the compressor discharge pressure is a maximum for any given value of engine speed. Corresponding to increasing lift of cam 120, in pressure regulator 98, of Figure 2, thruout the entire range of movement of the control lever 320, Figure 1, the fuel flow increases from a minimum value at the starting speed to a maximum value at full-throttle, or at full speed and maximum load. The increase of fuel flow between 0° and 30° lever positions results in an increase of engine speed from approximately 8,000 R. P. M. to full speed or 13,000 R. P. M., while the increase of fuel flow as the lever is advanced from the 30° quadrant setting corresponds to the increased torque shown by the family of curves (T), Figure 4.

The fuel flow decreases as the total pressure at the compressor entrance decreases, so that a family of curves (F) could be drawn corresponding to the family of curves in Figure 3.

The curve ($t''$), Figure 4, is an approximately horizontal line indicating the maximum temperature of the engine generally allowed at any position of the control lever, in consideration of structural and metallurgical limitations of construction. Sustained temperatures in excess of those shown by curve ($t''$) result in destruction of the engine and, in any engines of the general type shown in Figure 1 in which peak temperatures are allowed in excess of values specified by the curve ($t''$), such peak temperatures must be of extremely short duration. The curve slopes slightly downward indicating that the value of the maximum or limiting temperature decreases as the engine speed and torque increase.

The curve ($t$), Figure 4, shows the relationship of the normal engine temperature to the control lever position under conditions of steady-state operation and maximum total pressure at the compressor entrance. This curve corresponds to the previously described curve (F) which indicates the fuel flow under such operating conditions. The temperatures shown by curve ($t$) are maintained well below the limiting temperatures shown by curve ($t''$), the difference being greatest at low quadrant settings and hence low fuel flow and low power; temperature ($t$) approaches the limiting temperature ($t''$) at full-throttle operation but never equals the limiting temperature ($t''$).

In operation of the apparatus of Figures 1 and 2, assuming that the engine control lever 320 is rapidly advanced to 90° full quadrant position, the predetermined desired value of speed is rapidly changed from minimum to maximum. The lift of cam 120 in pressure regulator 98 is similarly rapidly increased to provide the relatively high fluid pressure upstream from control valve mechanism 128 required for full-speed operation. Simultaneously, the lift of cam 270 in pressure regulator 254 is rapidly increased corresponding to a maximum value of engine torque. The fuel flow to the engine would consequently rapidly become the relatively high value required at conditions of full speed and maximum torque were it not for control valve mechanisms 128 and 278. The governor mechanism is ineffective to limit the fuel flow during acceleration as the limiting speed has not been reached.

Owing to its inertia and to other factors, the response of the engine to rapid advance of the control lever is not accomplished without a short time lag, during which the engine speed increases and the compressor pressure differential gradually increases as shown in Figure 3. Therefore, neither control mechanism 128 nor mechanism 278 responds to rapid movement of control lever 320 with equally rapid movement of valves 142 and 292. The fuel flow to the engine thus is not permitted to become the value which corresponds to the 90° assumed lever position until acceleration is complete and steady-state operation ensues. As previously indicated however, control mechanisms 128 and 278 serve the additional function of compensating the effect of variations in total pressure at the compressor entrance and hence may be regarded as "altitude" and flight speed compensators, and the undercut 141 on valve 142 is designed so that there results a most favorable combination of "altitude" compensation and fuel flow rate of increase for all conditions of flight. Similarly, response to the demand for increased torque is retarded during acceleration by control mechanism 278 and the undercut 291 on valve 292 is designed so that there results a most favorable combination of "altitude" compensation and torque rate of increase for all conditions of flight.

Curve (F'), Figure 4, indicates the fuel flow during acceleration following rapid movement of the control lever to 90° quadrant position. Without the retarding effect of control mechanisms 128 and 278 the curve (F') would indicate the much greater fuel flow approximating the flow required to produce the limiting temperature ($t''$).

Undercuts 141 and 291 are designed so that, during acceleration, the rate of fuel flow increase due to a demand for greater speed or greater torque or both prevents temperatures exceeding a predetermined amount less than the limiting temperature ($t''$). Thus, the engine temperature during acceleration is as shown by curve ($t'$), Figure 4, and the value ($t''-t'$) is predetermined. There is approximately the same relationship between the temperatures ($t$) and ($t'$), for steady-state and acceleration conditions respectively, as there is between the corresponding fuel flow curves (F) and (F').

Referring to Figure 4, it is shown that the fuel flow (F') during acceleration to 90° quadrant position approaches the fuel flow (F) in steady-state operation as the rate of acceleration approaches zero, near maximum power, convergence of the curves beginning at a point indicated as approximately opposite the 75° quadrant position. This convergence is due to operation of the governor mechanism which remains ineffective until the limiting or predetermined

17 value of speed is exceeded. The governor mechanism becomes increasingly effective as the engine speed attains the limiting value while the fuel flow continues to increase, and steady-state operation is subsequently approached.

Similarly, there is convergence of the temperature curve (t') and (t), indicating that as the rate of acceleration decreases and hence as the fuel flow in excess of steady-state operation requirements decreases, there is a corresponding approach to the temperature applying to steady-state operation.

When the control lever is rapidly advanced to any other quadrant position, the apparatus functions in a manner corresponding to that applying to acceleration to full-throttle position. The quadrant setting at which lever movement is stopped determines the speed and torque desired, and hence the settings of the governor mechanism and the control valve mechanisms 128 and 278. Assuming rapid movement of the control lever to the 30° quadrant position, the governor mechanism begins to cut-in somewhat in advance of the occurrence of steady-state operation and the resulting convergence of fuel flow curves (F') and (F) is as shown at (a), Figure 4. The corresponding convergence of curves (t') and (t) is shown at (b), Figure 4.

Response of the apparatus to several other conditions of operation is explained in the following:

Condition A

From steady-state conditions of operation with the control lever in the position shown in Figure 1, it is assumed that the compressor pressure differential increases owing to descent in flight, to increased flight speed, or any other cause. The assumed change corresponds to an increase of the compressor discharge pressure from a point on a curve such as (b), Figure 3, to the point of intersection with a curve such as (a) and a vertical line drawn thru the point referred to on curve (b).

This change does not affect the position of control lever 320, the position of cam 204 or the governor mechanism setting, or the respective positions of cams 120 and 270. Control valve mechanisms 128 and 278 respond to the change, however, by increasing the respective effective areas of ports 146 and 296. Both the motor pressure in conduit 62 and the torque regulating pressure in conduit 312 are increased, and hence the fuel flow and the torque are increased. The increased torque tends to decrease the engine speed and the increased fuel flow tends to increase the speed. The relative effect of fuel flow and torque changes depends on the relative change in effective areas of ports 146 and 296 and on the value of the governor mechanism speed setting. While, in general, the effects are compensative, the apparatus may be designed so that the fuel flow desired to maintain the predetermined speed and the increased torque increases relatively great or small amounts; if the fuel flow increases relatively greatly the governor mechanism becomes more effective and if it increases relatively little the governor mechanism becomes only slightly more effective.

The accelerating effect of the pressure increase is accompanied by response of the apparatus similar to that previously explained in connection with movement of the control lever, except that the positions of cams 204, 120, and 270 are unaffected.

18

Condition B

From steady-state conditions of operation with the control lever in the position shown in Figure 1, it is assumed that the engine speed exceeds or falls below the governor mechanism setting, owing to temperature, fuel quality, or other changes affecting engine performance.

As the speed increases, the governor mechanism responds by forcing spindle 180 downward, thereby decreasing the effective opening of valve 168 and hence decreasing the motor pressure in conduit 62, decreasing the fuel flow, and thereby tending to restore the desired predetermined value of speed. Simultaneously the effective opening of valve 206 is increased, hence the torque regulating pressure in conduit 312 is increased and, as previously explained, there follows an increase in the torque control pressure in conduit 48 and hence an increase in the value of torque. The increased torque also tends to restore the predetermined value of speed so that both the fuel flow and torque are regulated in a manner to restore the desired engine speed. The effect of the governor mechanism over-ride control of fuel flow and torque values is such that the effect on torque alone is relatively small. Since the governor mechanism over-ride control of the fuel flow is always accompanied by slight movement of valve 206, it follows that in maintaining a constant predetermined value of speed in opposition to any factors tending to cause speed exceeding the predetermined value, the resulting increase in the value of torque depends on the relative contours of valves 168 and 206, and upon the character of the factors tending to cause excessive speed. It is possible to provide respective contours of undercuts 166 and 310 so that as spindle 180 moves, the effective area of port 160 changes at a much faster rate than that of port 308, so that a relatively small change in torque corresponds to a relatively great change in fuel flow, when such changes are produced by the governor mechanism.

In a condition in which the engine speed tends to fall below the governor mechanism setting value, the governor mechanism responds in a manner tending to produce reversal of the process described in the immediately preceding paragraph. As the speed decreases below the predetermined value, spindle 180 moves upward tending to increase the effective area of port 160 and to decrease that of port 308, thereby increasing the fuel flow and decreasing the torque, both changes being effective to increase the engine speed. The contour of undercuts 166 and 310 again determine the relative effects on fuel flow and torque required to compensate speed decrease below the predetermined governor mechanism setting.

Condition C

From steady-state conditions of operation with the control lever in the position shown in Figure 1, it is assumed that the engine temperature exceeds the predetermined limiting value at which the thermal control becomes effective. When the engine temperature equals the limiting temperatures, it is assumed that valve 225 in thermal control 218 is just seated and that no flow occurs from conduit 170 to conduit 230. As the engine temperature exceeds the predetermined limiting temperature, however, valve 225 opens, permitting fluid to flow from conduit 170 to conduit 232, thereby decreasing the motor pressure in conduits 210 and 62 and hence decreasing the fuel flow. As the fuel flow decreases the engine temperature decreases and valve 225 is restored to a seated position when the engine temperature again equals the predetermined limiting value and normal operation follows. A temporary decrease in the value of engine speed tends to occur simultaneously with the decrease of fuel flow and may be compensated as explained in reference to Condition (B).

Similarly, valve 330 of thermal control 322 opens when a predetermined temperature is exceeded, thereby causing a decrease of the torque regulating pressure in conduit 312. The engine torque decreases and the engine continues to operate at a reduced load until the temperature is corrected and valve 330 again closes.

The thermal controls 218 and 322 require time for response to either heating or cooling and, since they are unable to anticipate temperature changes, the temperature will continue to rise above the predetermined value before valves 225 and 330 open; and, similarly, the temperature will fall below the predetermined value before they are restored to their respective closed positions. This time lag varies directly with the rapidity of temperature change.

While the embodiment of my invention shown and described herein specifies use of collapsible bellows as pressure responsive means, the invention does not preclude employment of an equivalent arrangement of pressure responsive pistons, diaphragms, or other means. Consequently, where the term "bellows" is used in the appended claims, it is intended to embrace all mechanical equivalents thereof. Similarly, the use of engine oil pressure specified herein does not preclude employment of any suitable hydraulic fluid properly applied.

Other terms and expressions which I have employed are used as terms of description and not of limitation, and I have no intention, in the use of such terms and expressions, of excluding any equivalents of the features shown and described or portions thereof, but recognize that various modifications are possible within the scope of the invention claimed.

I claim as my invention:

1. In an internal combustion engine having associated therewith a variable delivery pump for delivering fuel thereto, a compressor for delivering combustion air to said engine, a shaft for transmitting power from said engine, a device connected to said shaft for absorbing said power, and means for controlling said power absorbing device to vary the torque transmitted by said shaft; fuel and torque control apparatus comprising: first and second means responsive to an air pressure in said engine; said first means being effective to control the fuel delivery of said pump and said second means being effective to regulate said device controlling means, whereby both the fuel flow and said shaft torque are predetermined functions of said compressor pressure.

2. In an internal combustion engine having associated therewith a variable delivery pump for delivering fuel thereto, a compressor for delivering combustion air to said engine, a shaft for transmitting power from said engine, a device connected to said shaft for varying the torque transmitted by said shaft; fuel and torque control apparatus comprising: hydraulic motor means responsive to a motor fluid pressure supplied thereto for controlling the fuel delivery of said pump, and first and second bellows means responsive to the discharge pressure in said compressor; said first bellows means being effective to control said motor fluid pressure and said second bellows means being effective to regulate said torque varying device, whereby both the fuel flow and said shaft torque are predetermined functions of said compressor discharge pressure.

3. Torque control apparatus for an internal combustion engine having associated therewith a compressor for delivering combustion air to said engine, a shaft for transmitting power from the engine, a device connected to said shaft for absorbing said power, and means responsive to said apparatus for automatically controlling said power absorbing device to vary the torque transmitted by said shaft; comprising: first means responsive to the torque transmitted by said shaft, and second means responsive to said first means and to an air pressure in said engine effective to regulate said device controlling means so that said shaft torque always varies as a selected function of said air pressure.

4. Torque control apparatus for an internal combustion engine having associated therewith a compressor for delivering combustion air to said engine, a shaft for transmitting power from the engine, a device connected to said shaft for absorbing said power, and means responsive to said apparatus for automatically controlling said power absorbing device to vary the torque transmitted by said shaft; comprising: first means responsive to the torque transmitted by said shaft, and means responsive to said first means and to the pressure downstream from said compressor effective to regulate said device controlling means, so that said shaft torque always varies as a selected function of said compressor pressure.

5. Torque control apparatus for an internal combustion engine having associated therewith a fuel supply system, a compressor for delivering combustion air to said engine, a shaft for transmitting power from the engine, a device connected to said shaft for absorbing said power, and means responsive to said apparatus for automatically controlling said power absorbing device to vary the torque transmitted by said shaft; comprising: first means responsive to the torque transmitted by said shaft, and second means responsive to said first means and to an air pressure in said engine effective to regulate said device controlling means and hence to always vary said shaft torque as a selected function of said air pressure, and a connection between said second means and said fuel system for maintaining a selected relationship between said torque and the flow in said fuel system.

6. Torque control apparatus for an internal combustion engine having associated therewith a fuel supply system, a compressor for delivering combustion air to said engine, a shaft for transmitting power from the engine, a device connected to said shaft and responsive to said apparatus for automatically varying the torque transmitted by said shaft; comprising: first means responsive to the torque transmitted by said shaft, and second means, including a bellows responsive to the pressure downstream from said compressor, effective to regulate said torque device to vary said shaft torque always as a function of said compressor pressure, and a connection between said second means and said fuel system for maintaining a selected relationship between said shaft torque and the flow in said fuel system.

7. In an internal combustion engine having associated therewith a variable delivery pump for delivering fuel thereto, a compressor for delivering combustion air to said engine, a shaft for transmitting power from said engine, a device connected to said shaft for varying the torque transmitted by said shaft; fuel and torque control apparatus comprising: a source of hydraulic fluid at substantially constant superatmospheric pressure, a main conduit for the flow of fluid from said source, first and second parallel outlet channels from said main conduit to a region of relatively low pressure, each having at least one restriction therein for controlling the flow therethru; first means responsive to the pressure differential across said compressor for regulating a pressure in said first channel and motor means responsive to said pressure in said first channel for controlling the fuel delivery of said pump; second means responsive to said compressor pressure differential for regulating a fluid pressure in said second outlet channel, and connecting means for making said torque varying device responsive to said fluid pressure in said second outlet channel, whereby both the fuel flow and said shaft torque are predetermined functions of said compressor pressure differential.

8. In an internal combustion engine having associated therewith a compressor for delivering combustion air to said engine, a shaft for transmitting power from the engine, a device connected to said shaft for varying the torque transmitted by said shaft; torque control operation comprising: a source of hydraulic fluid at substantially constant superatmospheric pressure and a conduit for the flow of fluid from said source, an outlet channel from said conduit to a region of relatively low pressure, said channel having at least one fixed restriction therein for controlling the flow therethru, means responsive to the pressure differential across said compressor for regulating a fluid pressure in said outlet channel, and connecting means for making said torque varying device responsive to said fluid pressure in said outlet channel, whereby said shaft torque is a predetermined function of said compressor pressure differential.

9. In an internal combustion engine having associated therewith a fuel supply system, a compressor for delivering combustion air to said engine, a shaft for transmitting power from the engine, a device connected to said shaft for varying the torque transmitted by said shaft; torque control apparatus comprising: a source of hydraulic fluid at substantially constant superatmospheric pressure and a conduit for the flow of fluid from said source, an outlet channel from said conduit to a region of relatively low pressure, said channel having at least one fixed restriction therein for controlling the flow therethru, means responsive to the pressure differential across said compressor for regulating a fluid pressure in said outlet channel, connecting means for making said torque varying device so responsive to said fluid pressure in said outlet channel that said shaft torque is a predetermined function of said compressor pressure differential, and a connection between said torque control apparatus and said fuel system for maintaining a predetermined relationship between said torque and the fuel flow to said engine.

10. In an internal combustion engine having associated therewith a fuel supply system, a compressor for delivering combustion air to said engine, a shaft for transmitting power from the engine, and a device for varying the torque of said shaft; torque control apparatus comprising: a source of hydraulic fluid at substantially constant superatmospheric pressure and a conduit for the flow of fluid from said source, an outlet channel from said conduit to a region of relatively low pressure, a fixed restriction in said outlet channel and means for regulating the pressure differential thereacross at a substantially constant value, first valve means in said outlet channel downstream from said restriction, responsive to the compressor discharge pressure in said engine, for regulating a control pressure downstream from said first valve means, means for making said torque varying device so responsive to said control pressure that said shaft torque is a function of said compressor discharge pressure, and second valve means, responsive to the engine speed, for modifying said control pressure and hence said torque when a predetermined value of said speed is exceeded.

11. In an internal combustion engine having associated therewith a variable delivery pump for delivering fuel thereto, a compressor for delivering combustion air to said engine, a shaft for transmitting power from said engine, a torque meter responsive to the torque of said shaft, a device for varying the torque of said shaft; fuel and torque control apparatus comprising: a source of hydraulic fluid at substantially constant superatmospheric pressure, a main conduit for the flow of fluid from said source, first and second parallel outlet channels from said main conduit to a region of relatively low pressure, valve means responsive to the pressure differential of said compressor and to the speed and temperature of said engine, said valve means being effective to vary a pressure in said first channel, motor means responsive to said varied pressure effective to control the fuel delivery of said pump, means, responsive to said compressor pressure differential and said engine speed, effective to vary a pressure of fluid flowing in said second channel, means connected to said torque meter for producing a fluid pressure proportional to said shaft torque, bellows means responsive to said second channel pressure and to said proportional pressure for regulating a control pressure, said control pressure being effective to operate said torque varying device in response to said pressure of fluid flowing in said second channel; whereby both the fuel delivery and said shaft torque are predetermined functions of said compressor pressure differential and said engine speed, and the fuel flow is also a predetermined function of said temperature.

12. In an internal combustion engine having associated therewith a fuel supply system, a compressor for delivering combustion air to said engine, a shaft for transmitting power from the engine, a torque meter responsive to the torque of said shaft, and a device for varying the torque of said shaft; torque control apparatus comprising: a source of hydraulic fluid at substantially constant superatmospheric pressure and a conduit for the flow of fluid from said source, an outlet channel from said conduit to a region of relatively low pressure, first bellows means responsive to the compressor pressure differential in said engine to regulate a fluid pressure in said outlet channel proportional to said pressure differential, means connected to said torque meter for producing a fluid pressure proportional to the actual value of said torque, second bellows means responsive to said two fluid pressures respectively proportional to said desired and said actual values of said torque, said second bellows means being effective to regulate a control pressure and said torque varying device which is responsive thereto, whereby said actual torque varies as a predetermined function of said compressor pressure differential, and valve means responsive to the speed of said engine for modifying said control pressure when a predetermined value of speed is exceeded, thereby increasing the actual value of said torque and decreasing the engine speed.

13. In an internal combustion engine having associated therewith a compressor for delivering combustion air to said engine, a shaft for transmitting power from the engine, a torque meter responsive to the torque of said shaft, and a device for varying said shaft torque; torque control apparatus comprising: a source of hydraulic fluid and a pump connected thereto, means maintaining a substantially constant discharge pressure in said pump, a conduit for the flow of fluid from said pump to a region of relatively low pressure, a fixed restriction in said conduit and means maintaining the pressure downstream from said restriction substantially constant, manually operated cam means for determining the value of said downstream pressure, regulator valve means responsive to the compressor discharge pressure in the engine and effective to control a pressure in said conduit proportional to the value of desired shaft torque, means connected to said torque meter for producing a pressure proportional to the value of the actual shaft torque, means responsive to the fluid pressure differential between the respective pressures proportional to said actual and said desired torque, connecting means for making said torque varying device responsive to said fluid pressure differential responsive means, whereby the actual torque varies as a predetermined function of said compressor discharge pressure and said manually operated cam means, and governor valve means responsive to the engine speed for modifying the action of said fluid pressure differential responsive means when a predetermined value of speed is exceeded.

14. In an internal combustion engine having associated therewith a variable delivery pump for delivering fuel thereto, a compressor for delivering combustion air to the engine, a shaft for transmitting power from said engine, a device for varying said shaft torque, and a manually operated engine control lever; fuel and torque control apparatus comprising: motor means responsive to a motor pressure supplied thereto for controlling the fuel delivery of said pump; first and second manually controlled means, first and second means responsive to an air pressure in said engine, first and second control means responsive to the engine speed, said three first means being effective to control said motor pressure, whereby said fuel delivery varies as a function of said first manual control, said engine pressure, and said speed; said three second means being effective to control said torque varying device so that said torque varies as a function of said second manual control, said engine pressure, and said speed; a connection between said engine control lever and said speed responsive means and a variable means in said speed responsive means responsive to said lever, for determining a limiting speed at which said first and second control means are effective, a connection between said variable means and said first and second manually controlled means for maintaining a preselected relationship between the respective positions of said engine control lever, said first manual means, and said second manual means; and cam means controlling said preselected relationship in a manner such that movement of said control lever, from an initial position at which both engine speed and torque are minimum to a position at which said speed is maximum, is effective to produce relatively small change in said torque, whereas continued movement of said lever to an extreme position corresponding to maximum torque does not change said predetermined value of engine speed.

15. In an internal combustion engine having associated therewith a variable delivery pump for delivering fuel thereto, a shaft for transmitting power from said engine, a torque meter responsive to the torque of said shaft, and a device for varying said shaft torque; fuel and torque control apparatus comprising: a source of hydraulic fluid at substantially constant superatmospheric pressure; first valve means connected to said source, a first manually operated cam means, said first valve means being responsive to said constant pressure and to said first cam means, and being effective to regulate a first pressure, motor means for controlling the fuel delivery of said pump responsive to said first pressure; second valve means connected to said source, and a second manually operated cam means, said second valve means being responsive to said constant pressure and to said second cam means and effective to regulate a second pressure proportional to the desired shaft torque; third valve means connected to said source responsive to said torque meter and effective to regulate a third pressure proportional to said actual torque; fourth valve means connected to said source responsive to said second and said third pressures and effective to regulate a fourth pressure, and means transmitting said fourth pressure to said torque varying device, said device being responsive to said fourth pressure, whereby the fuel delivery is a predetermined function of said constant pressure and said first manually operated means, and said actual shaft torque varies as a predetermined function of said constant pressure and said second manually operated means.

16. In an internal combustion engine having associated therewith a variable delivery pump for delivering fuel thereto, a shaft for transmitting power from said engine, a device for varying the torque of said shaft, and a manually operated engine control lever; fuel and torque control apparatus comprising: first control means including a first manually operated valve, a first regulator responsive to an air pressure in said engine, and first governor means responsive to the engine speed, said first control means being effective to control said pump delivery and hence the fuel flow as a function of said first manual control and said air pressure, said function being limited by said first governor means so that the fuel flow may not vary to increase the engine speed beyond a predetermined value; second control means including a second manually operated valve, a second regulator responsive to said engine pressure, and second governor means responsive to the engine speed, said second control means being effective to control said torque varying device and hence said shaft torque as a function of said second manual control and said air pressure, said last function being limited by said second governor means so that said shaft torque can not vary to increase the engine speed beyond a predetermined value; and a connection between said engine control lever and said first and second manual controls, whereby as angular movement is imparted to said lever, from an extreme position corresponding to minimum engine speed to a predetermined intermediate position, said lever movement is effective to vary said first control means and hence said speed but is not effective to vary said second control means or said torque.

17. In an internal combustion engine having associated therewith a variable delivery pump for delivering fuel thereto, a shaft for transmitting power from said engine, a device for varying the torque of said shaft; fuel and torque control apparatus comprising: first control means including a first manually operated valve, a first regulator responsive to an air pressure in said engine, and first governor means responsive to the engine speed, said first control means being effective to control said pump delivery and hence the fuel flow as a function of said first manual control and said air pressure, said function being limited by said first governor means so that the fuel flow can not vary to increase the engine speed beyond a predetermined value; second control means including a fixed restriction and means causing flow of a fluid therethru, pressure responsive means for maintaining a substantially constant pressure downstream from said restriction, means for selecting the value of said constant pressure, a second regulator responsive to said engine pressure, and second governor means, said second control means being effective to control said torque varying device and hence said shaft torque as a function of said value selecting means and said air pressure, said last function being limited by said second governor means so that said shaft torque can not vary to increase the engine speed beyond a predetermined limit; and a connection between said first manual control and said value selecting means, whereby progressive movement of said first manual control from a first position corresponding to minimum engine power, thruout the total range of operation of said first manual control, is effective to operate said value selecting means whereby there are successive respective intervals during which said torque does not change as said speed increases, said torque changes slightly as said speed increases a predetermined amount, and said torque increases as said speed remains substantially constant.

18. In an internal combustion engine having associated therewith a variable delivery pump for delivering fuel thereto, a shaft for transmitting power from said engine, a device for varying the torque of said shaft; fuel and torque control apparatus comprising: first control means, including a first manually controlled valve means and means responsive to air pressure conditions in said engine, said first control means being effective to control the fuel delivery of said pump and hence the fuel flow; second control means, including a second manually controlled valve means and means responsive to air pressure conditions in said engine, said second control means being effective to produce a pressure proportional to the desired shaft torque, piston means for obtaining a pressure proportional to the actual shaft torque; a mechanism responsive to said respective pressures proportional to said desired and said actual shaft torques and effective to regulate said torque varying device, whereby said actual torque is a predetermined function of said second manually controlled valve means and said engine conditions; means responsive to the speed and temperature of said engine for limiting the fuel flow to prevent said engine speed and temperature from exceeding predetermined limits, and a connection between said first and second manually controlled valve means whereby said speed is variable within a predetermined range thereof, said torque remaining substantially constant and at its minimum value, and whereby said torque is variable within a preselected range thereof, said speed remaining substantially constant and at its maximum value.

19. In an internal combustion engine having associated therewith a variable delivery pump for delivering fuel thereto, a shaft for transmitting power from said engine, a device for varying the torque of said shaft; fuel and torque control apparatus comprising: first control means, including a first manually controlled valve means and means responsive to air pressure conditions in said engine, said first control means being effective to control the fuel delivery of said pump and hence the fuel flow; second control means, including a second manually controlled valve means and means responsive to air pressure conditions in said engine, said second control means being effective to produce a pressure proportional to the desired shaft torque, piston means for obtaining a pressure proportional to the actual shaft torque; a mechanism responsive to said respective pressures proportional to said desired and said actual shaft torques and effective to regulate said torque varying device, whereby said actual torque is a predetermined function of said second manually controlled valve means and said engine conditions; and a connection between said first and second manually controlled valve means.

20. In an internal combustion engine having associated therewith a compressor and a variable delivery pump for respectively delivering combustion air and fuel thereto, a shaft for transmitting power from said engine, a device for varying the torque of said shaft; fuel and torque control apparatus comprising: a governor responsive to the engine speed, valve means responsive to said governor and effective to vary the fuel delivery of said pump so as to decrease said delivery when a predetermined value of engine speed is exceeded; manually operated cam means connected to said governor and effective to determine the value of speed at which said governor responsive valve means is effective to decrease said delivery; and a connection between said governor responsive valve means and said torque varying device to maintain a preselected relationship between said torque and said predetermined speed.

21. Fuel and torque control apparatus for an internal combustion engine having a pump and an air compressor for respectively deliverying fuel and combustion air thereto, a shaft for transmitting power therefrom, and a device responsive to said apparatus for automatically varying the torque of said shaft; comprising: first means responsive to the torque transmitted by said shaft, second and third means responsive to said first means and to an air pressure in said engine; said second means being adapted to control the fuel delivery of said pump, and said third means being adapted to control said torque device, so that both said fuel delivery and said shaft torque are always selected functions of said engine pressure.

22. Fuel and torque control apparatus for an internal combustion engine having a pump and an air compressor for respectively delivering fuel and combustion air thereto, a shaft for transmitting power therefrom, a device responsive to said apparatus for automatically varying the torque of said shaft, and manually operable means for controlling the operation of said engine; comprising: first means responsive to the torque transmitted by said shaft, and second and third means responsive to said first means and to an air pressure in said engine and to the movement of said manual control means; said second means being adapted to control the fuel delivery of said pump, and said third means being adapted to control said torque device, so that both said fuel delivery and said shaft torque are always selected functions of said engine pressure and the position of said manual control means.

23. Fuel and torque control apparatus for an internal combustion engine having a pump for delivering fuel thereto, a shaft for transmitting power therefrom, a device responsive to said apparatus for automatically varying the torque of said shaft, and manually operable means for controlling the operation of said engine; comprising: first means responsive to the torque transmitted by said shaft, second means, responsive to said first means, for controlling the fuel delivery of said pump, third means, responsive to said first means, for controlling said torque device, and means responsive to said manual control means for coordinating the operation of said second and third means so that said fuel delivery and said shaft torque are always selected functions of the position of said manual control means.

MILTON E. CHANDLER.

REFERENCES CITED

The following references are of record in the file of this patent:

UNITED STATES PATENTS

| Number | Name | Date |
|---|---|---|
| 2,193,114 | Seippel | Mar. 12, 1940 |
| 2,336,052 | Anderson | Dec. 7, 1943 |
| 2,336,232 | Doran | Dec. 7, 1943 |
| 2,358,815 | Lysholm | Sept. 26, 1944 |
| 2,407,317 | Mennesson | Sept. 10, 1946 |
| 2,525,460 | Roesch | Oct. 10, 1950 |

FOREIGN PATENTS

| Number | Country | Date |
|---|---|---|
| 490,978 | Great Britain | Aug. 24, 1938 |